(12) United States Patent
Fujimori

(10) Patent No.: US 10,193,949 B2
(45) Date of Patent: Jan. 29, 2019

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 14/829,367

(22) Filed: Aug. 18, 2015

(65) Prior Publication Data

US 2016/0057194 A1    Feb. 25, 2016

(30) Foreign Application Priority Data

Aug. 20, 2014  (JP) .................................. 2014-167827

(51) Int. Cl.
| | | |
|---|---|---|
| *G06F 15/16* | (2006.01) | |
| *H04L 29/08* | (2006.01) | |
| *H04L 29/06* | (2006.01) | |
| *H04N 21/845* | (2011.01) | |
| *G06F 3/0484* | (2013.01) | |

(52) U.S. Cl.
CPC .............. *H04L 67/02* (2013.01); *H04L 65/00* (2013.01); *H04L 67/42* (2013.01); *G06F 3/0484* (2013.01); *H04L 63/102* (2013.01); *H04L 65/60* (2013.01); *H04N 21/8456* (2013.01)

(58) Field of Classification Search
CPC ....... H04L 67/02; H04L 63/102; H04L 65/00; H04L 67/42; H04L 67/06; H04L 65/60; H04L 65/607; H04L 63/0853; G06F 3/0484; H04N 21/26258; H04N 21/8456; H04N 7/17318
USPC ........................................................ 709/219
See application file for complete search history.

(56) References Cited

U.S. PATENT DOCUMENTS

| | | | | |
|---|---|---|---|---|
| 7,554,576 B2* | 6/2009 | Erol | ................... | G06F 17/30244 |
| | | | | 348/159 |
| 8,599,277 B2 | 12/2013 | Fleming | | |
| 9,521,459 B2* | 12/2016 | Earle | ................... | H04N 21/4622 |
| 2009/0006420 A1* | 1/2009 | Morrill | ............... | G06F 21/6236 |
| 2015/0052258 A1* | 2/2015 | Johnson | ................ | H04L 67/141 |
| | | | | 709/228 |
| 2016/0057194 A1* | 2/2016 | Fujimori | ................. | H04L 67/02 |
| | | | | 709/219 |
| 2017/0230434 A1* | 8/2017 | Wang | ..................... | H04L 65/60 |

\* cited by examiner

*Primary Examiner* — David R Lazaro
(74) *Attorney, Agent, or Firm* — Canon U.S.A., Inc. IP Division

(57) ABSTRACT

A communication apparatus includes an acquisition unit configured to acquire a media content, a transmission unit configured to transmit the media content acquired by the acquisition unit to another communication apparatus, a determination unit configured to determine whether to describe, as an acquisition source URL of the media content acquired by the acquisition unit, a URL of the communication apparatus or a URL of the another communication apparatus, in accordance with a state of transmission of the media content by the transmission unit, a generation unit configured to generate, based on the determination made by the determination unit, a description file in which the acquisition source URL of each predetermined unit of the media content is described, and a provision unit configured to provide the description file generated by the generation unit.

14 Claims, 13 Drawing Sheets

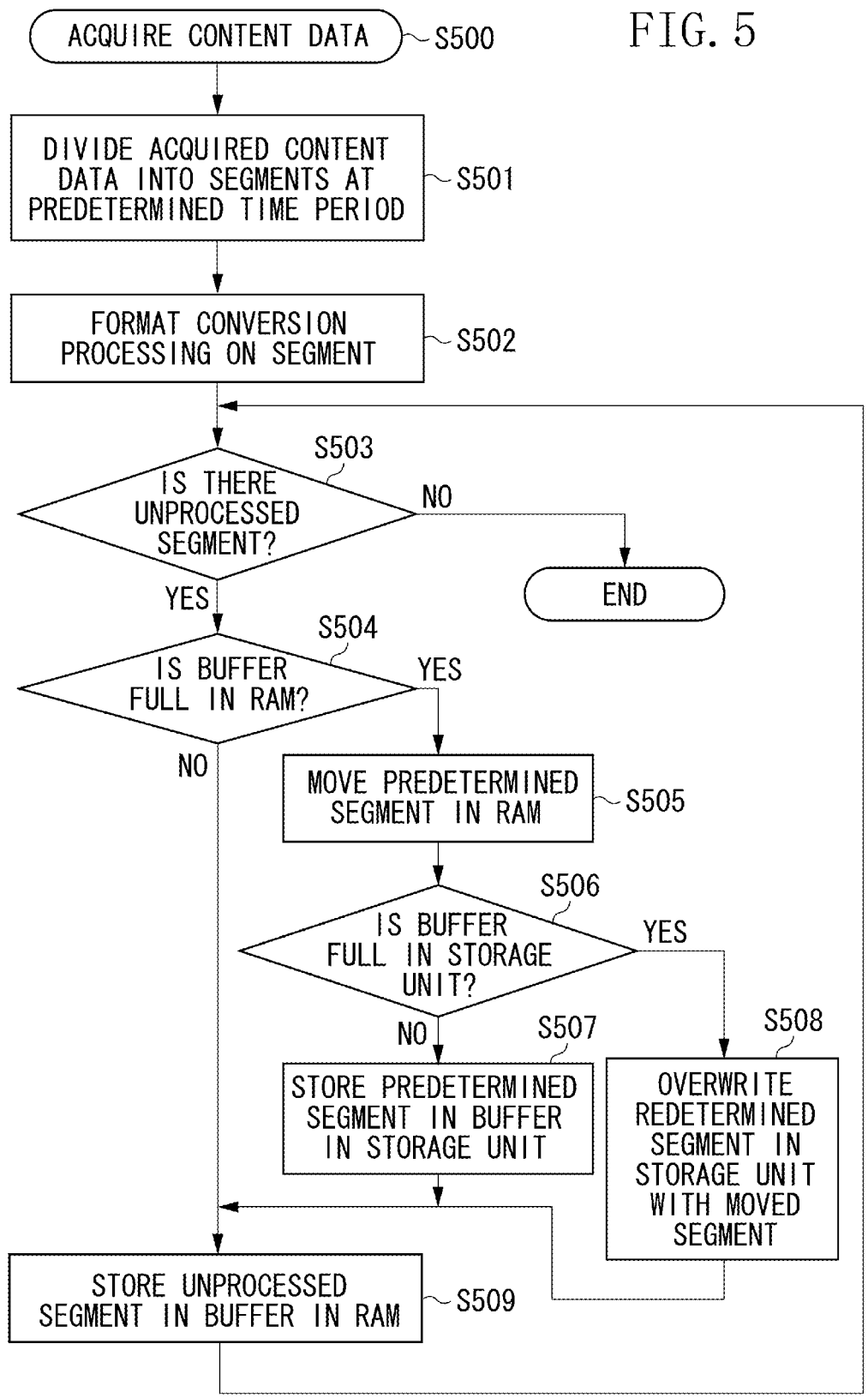

FIG. 6

```
<?xml version="1.0"?>
<MPD type="dynamic" minimumUpdatePeriod="PT2.00S" ~603
 availabilityStartTime="20XX-XX-XXTXX:XX:XX" ~604
 timeShiftBufferDepth="PT4.00S"> ~605
<Period start="PT0.00S" duration="PT2.00S">
 <AdaptationSet>
  <Representation id="1">
   <SegmentList>
    <SegmentURL media="http://ExampleSource/segment1.mp4">
   </SegmentList>
  </Representation>
 </AdaptationSet>
</Period>
</MPD>
```

```
<?xml version="1.0"?>
<MPD type="dynamic" minimumUpdatePeriod="PT2.00S"
availabilityStartTime="20XX-XX-XXTXX:XX:XX"
timeShiftBufferDepth="PT4.00S" >
<Period start="PT2.00S" duration="PT2.00S">
   <AdaptationSet>
     <Representation id="1">
       <SegmentList>
         <SegmentURL media="http://ExampleSource/segment2.mp4">
       </SegmentList>
     </Representation>
   </AdaptationSet>
</Period>
<Period start="PT0.00S" duration="PT2.00S">
   <AdaptationSet>
     <Representation id="1">
       <SegmentList>
         <SegmentURL media="http://ExampleProxy/segment1.mp4">
       </SegmentList>
     </Representation>
</AdaptationSet>
</Period>
</MPD>
```

FIG. 8

```
<?xml version="1.0"?>
<MPD type="dynamic" minimumUpdatePeriod="PT2.00S"
availabilityStartTime="20XX-XX-XXTXX:XX:XX"
timeShiftBufferDepth="PT4.00S">
  <Period start="PT2.00S" duration="PT2.00S">           ~804
    <AdaptationSet>
      <Representation id="1">
        <SegmentTemplate duration="PT2.00S"
          media=http://ExampleSource/segment$Number$.mp4    ~802
          startNumber=2>                                    ~805
        </SegmentTemplate>
      </Representation>
    </AdaptationSet>
  </Period>
  <Period start="PT0.00S" duration="PT2.00S">           ~806
    <AdaptationSet>
      <Representation id="1">
        <SegmentTemplate duration="PT2.00S"
          media=http://ExampleProxy/segment$Number$.mp4     ~803
          startNumber=1>                                    ~807
        </SegmentList>
      </Representation>
    </AdaptationSet>
  </Period>
</MPD>
```

```
<?xml version="1.0"?>
<MPD type="static" mediaPresentationDuration="PT60M"
availabilityStartTime="20XX-XX-XXTXX:XX:XX" >
<Period start="PT0.00S" duration="PT60M">
   <AdaptationSet>
    <Representation id="1">
      <SegmentTemplate duration="PT2.00S"
        media=http://ExampleProxy/segment$Number$.mp4
        startNumber=1>
      </SegmentTemplate>
    </Representation>
   </AdaptationSet>
</Period>
</MPD>
```

FIG. 10

```
<?xml version="1.0"?>
<MPD type="dynamic" minimumUpdatePeriod="PT60M"
availabilityStartTime="20XX-XX-XXTXX:XX:XX"
timeShiftBufferDepth="PT4.00S" >
<Period start="PT0.00S" duration="PT60M">
   <AdaptationSet>
    <Representation id="1">
      <SegmentTemplate duration="PT2.00S"
        media=http://ExampleSource/segment$Number$.mp4
        startNumber=1>
      </SegmentTemplate>
    </Representation>
   </AdaptationSet>
</Period>
</MPD>
```

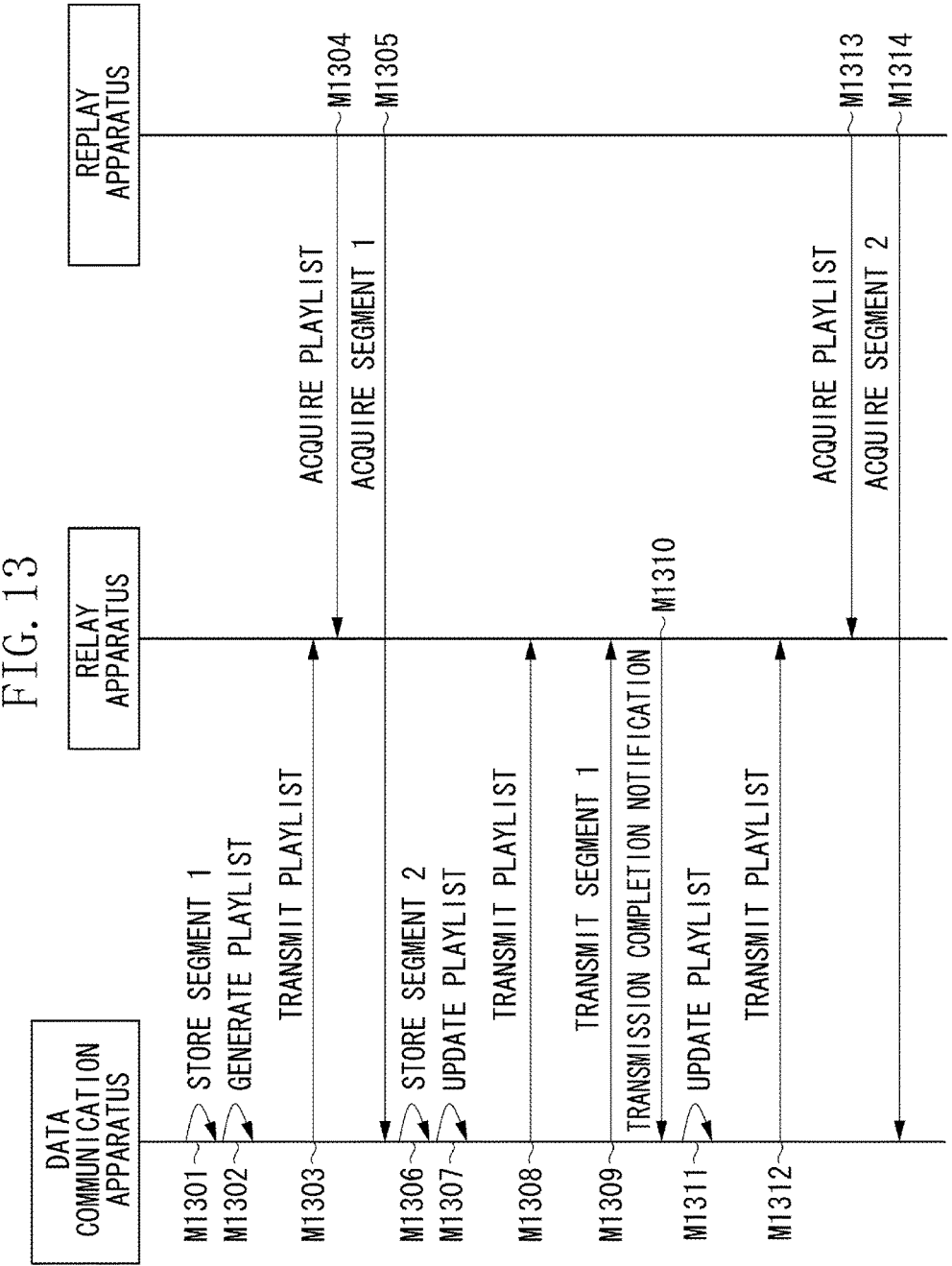

COMMUNICATION APPARATUS, COMMUNICATION METHOD, AND STORAGE MEDIUM

BACKGROUND OF THE INVENTION

Field of the Invention

The present invention relates to a communication method for a communication apparatus that transmits contents.

Description of the Related Art

In recent years, stream distribution systems that distribute contents, in a streaming format, including audio data and video data to users have been developed. Such a system enables a user to view desired contents, such as live contents or recorded contents such as movies, received with the user's terminal apparatus via a network.

U.S. Pat. No. 8,599,277 discusses a method for providing content data, acquired by a network camera through image capturing, to a client. More specifically, content data, corresponding to the current time point, is distributed to the client through direct transmission from the network camera. On the other hand, content data that was recorded in the past is transmitted to the client from a storage server to which the content data has been transferred from the network camera.

However, reception of content data by a reception apparatus might be difficult in some cases.

For example, when a reception apparatus attempts to acquire, from the network camera, contents designated by a user of the reception apparatus even though the contents have already been transmitted to the storage server from the network camera, acquisition of the contents might be difficult. The present invention is directed to solving the problem described above.

SUMMARY OF THE INVENTION

In accordance with an aspect of the present invention, a communication apparatus includes an acquisition unit configured to acquire a media content, a transmission unit configured to transmit the media content acquired by the acquisition unit to another communication apparatus, a determination unit configured to determine whether to describe, as an acquisition source URL of the media content acquired by the acquisition unit, a URL of the communication apparatus or a URL of the another communication apparatus, in accordance with a state of transmission of the media content by the transmission unit, a generation unit configured to generate, based on the determination made by the determination unit, a description file in which the acquisition source URL of each predetermined unit of the media content is described, and a provision unit configured to provide the description file generated by the generation unit.

Further features of the present invention will become apparent from the following description of exemplary embodiments with reference to the attached drawings.

BRIEF DESCRIPTION OF THE DRAWINGS

FIG. 5 is a flowchart illustrating content data segmentation processing according to the exemplary embodiment.

FIG. 6 illustrates an example of a playlist according to the exemplary embodiment.

FIG. 7 illustrates an example of a playlist according to the exemplary embodiment.

FIG. 8 illustrates an example of a playlist according to the exemplary embodiment.

FIG. 9 illustrates an example of a playlist according to the exemplary embodiment.

FIG. 10 illustrates an example of a playlist according to the exemplary embodiment.

FIG. 13 illustrates an example of a sequence among the data communication apparatus, the replay apparatus, and the relay apparatus, according to the exemplary embodiment.

DESCRIPTION OF THE EMBODIMENTS

<Configuration Diagram of Entire System>

Figure 1:
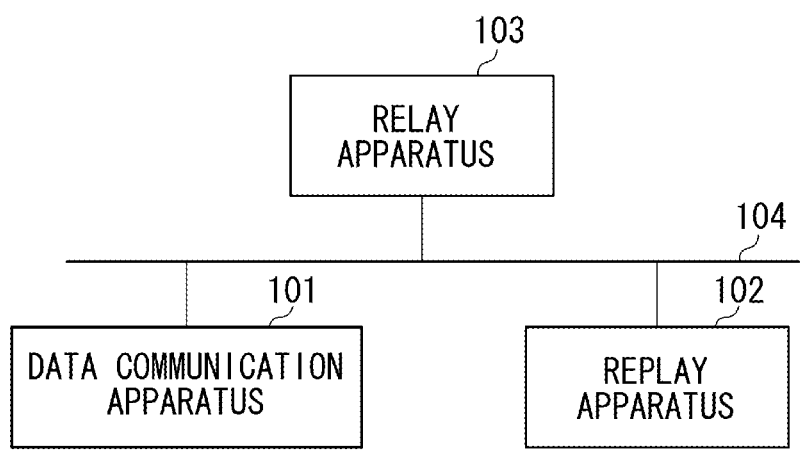
FIG. 1 is a block diagram illustrating a system configuration according to an exemplary embodiment.

FIG. 1 is a block diagram illustrating a configuration example of a content data distribution system according to an exemplary embodiment. As illustrated in FIG. 1, the content data distribution system according to the present exemplary embodiment includes a data communication apparatus 101, a replay apparatus 102, a relay apparatus 103, and a network 104.

The network 104 is a general Internet line. However, the network 104 is not limited to the Internet line used in the present exemplary embodiment, and may be other lines such as a public network such as a wide area network (WAN), a local network such as a local area network (LAN) and a personal area network (PAN), a dedicated line such as a virtual private network (VPN), an intranet, and an on-premise line.

The data communication apparatus 101 is a communication apparatus capable of acquiring moving image data and transmitting the moving image data in response to a request from the replay apparatus 102. The data communication apparatus 101 may be, for example, a camera apparatus, a video camera apparatus, a smartphone apparatus, a personal computer (PC) apparatus, and a mobile phone, but is not limited thereto. A configuration in which the data communication apparatus 101 captures and then acquires the moving image data may be employed. Alternatively, a configuration in which the data communication apparatus 101 acquires the moving image data captured by another image capturing apparatus and the like may be employed. One or more data communication apparatuses 101 may be connected to the network 104.

The replay apparatus 102 has a function of reproducing/displaying content data, a function of interpreting a playlist, and a communication function. However, the replay apparatus 102 does not necessarily have to have the function of reproducing/displaying content data, and may be a reception apparatus that simply acquires and stores content data or a reception apparatus that has a function similar to a server providing the content data to other apparatuses. The replay apparatus 102 functions as a reception apparatus that receives the content data. In the present exemplary embodiment, the content data includes moving image data. The playlist will be described in detail below.

The replay apparatus 102 may be, for example, a smartphone apparatus, a PC apparatus, a television receiver, and a mobile phone, but is not limited thereto. A configuration may be employed in which a function as the replay apparatus 102 is implemented through communications between different devices which separately implement the function of reproducing/displaying content data, the function of interpreting the playlist described below, and the communication function. One or more replay apparatuses 102 may be connected to the network 104.

The data communication apparatus 101 according to the present exemplary embodiment divides a moving image as the content data into a plurality of segments and transmits a segment corresponding to a request from the replay apparatus 102 to the replay apparatus 102. In the present exemplary embodiment, terms such as "request", "delete", "acquire", and "store" used for a segment are equivalent to those used for divided content data obtained by dividing the contents into segments.

The data communication apparatus 101 according to the present exemplary embodiment transmits the playlist to the replay apparatus 102 in response to a request from the replay apparatus 102. The playlist is list information including an acquisition source of each segment. The replay apparatus 102, which has acquired the playlist from the data communication apparatus 101, refers to the playlist and acquires a desired segment by using information on the acquisition source corresponding to the segment.

The relay apparatus 103 has a function of receiving and accumulating the content data transmitted from the data communication apparatus 101, and transmitting the content data to the replay apparatus 102 in response to a request from the replay apparatus 102. The relay apparatus 103 according to the present exemplary embodiment manages the content data for each segment. As described below, the relay apparatus 103 may have a function of relaying or generating the playlist. The relay apparatus 103 may be, for example, a server apparatus, a PC apparatus, a gateway apparatus, and a smartphone apparatus, but is not limited thereto. One or more relay apparatuses 103 may be connected to the network 104.

The data communication apparatus 101 according to the present exemplary embodiment transmits a predetermined segment among a plurality of segments to the relay apparatus 103. The data communication apparatus 101 can delete the segment transmitted to the relay apparatus 103 from a memory of the data communication apparatus 101. The relay apparatus 103 can transmit the segment, acquired from the data communication apparatus 101, to the replay apparatus 102 in response to a request from the replay apparatus 102.

<Hardware Configuration Diagram of Data Communication Apparatus>

Figure 2:
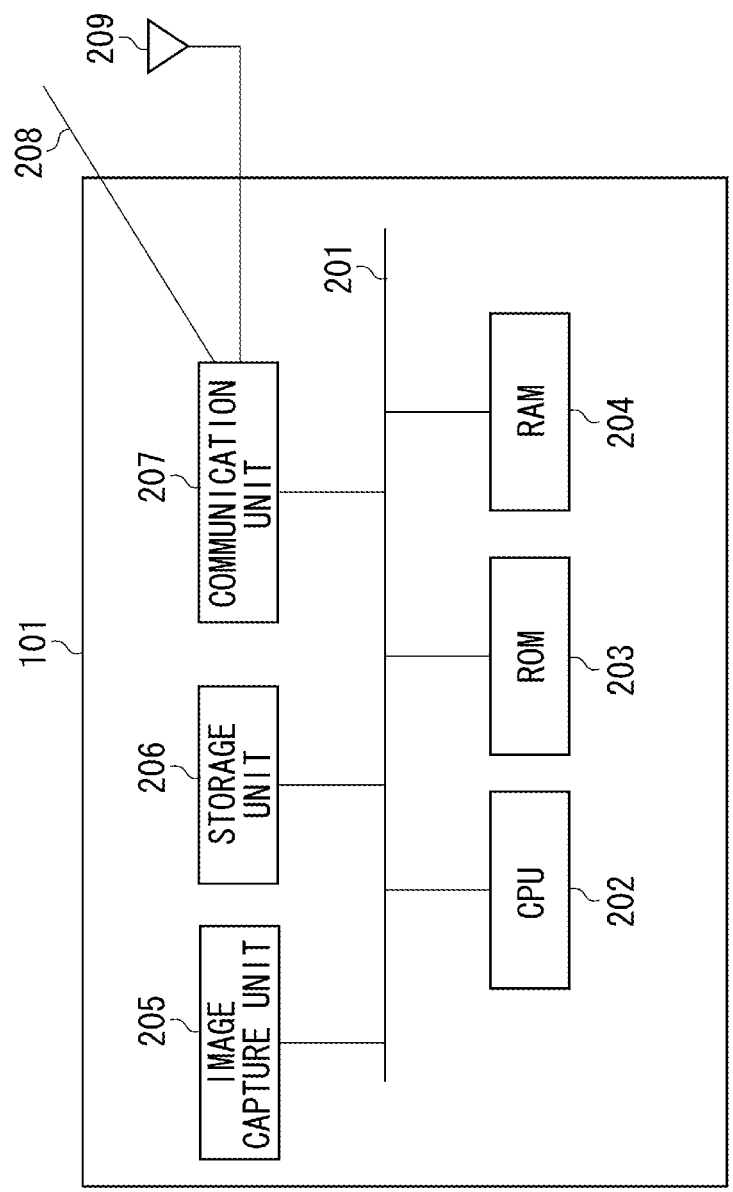
FIG. 2 is a block diagram illustrating a hardware configuration of a data communication apparatus according to the exemplary embodiment.

FIG. 2 is a block diagram illustrating an example of a hardware configuration of the data communication apparatus 101 according to the present exemplary embodiment. As described above, the data communication apparatus 101 according to the present exemplary embodiment can be realized by using a camera apparatus, a video camera apparatus, a smartphone apparatus, a PC apparatus, a mobile phone, or the like. As illustrated in FIG. 2, the data communication apparatus 101 includes a bus 201, a central processing unit (CPU) 202, a read only memory (ROM) 203, a random access memory (RAM) 204, an image capture unit 205, a storage unit 206, and a communication unit 207. As described above, the image capture unit 205 may be a device different from the data communication apparatus 101.

The CPU 202 implements various functions of the data communication apparatus 101 by executing various types of processing, in accordance with a computer program and processing data, stored in the ROM 203, the RAM 204, and the storage unit 206. The RAM 204, formed of a volatile storage medium such as a semiconductor memory, temporarily stores the computer program and the processing data executed by the CPU 202.

The ROM 203 and the storage unit 206 are each formed of a non-volatile storage medium such as a magnetic or an optical storage medium, and a semiconductor memory that can be read by the CPU 202. The ROM 203 and the storage unit 206 store a basic program such as a boot program for the data communication apparatus 101, an application program, such as a distribution program, for implementing an operation of the data communication apparatus 101 described below, and processing data for executing the programs.

A part or all of the information stored in the ROM 203 and the storage unit 206 may be installed via the network 104. The application program described above may be read out from the storage medium by the CPU 202 when the processing described below is executed. In this case, the CPU 202, when executing the processing, stores the application program, which has been read out from the storage medium, in the RAM 204, and then executes the application program. The storage medium includes a semiconductor memory, a magnetic disk, an optical disk, a magneto-optical disk, and a magnetic tape, i.e., all types of storage mediums that can be read by the CPU 202.

The image capture unit 205 captures an image, acquires (generates) moving image data as content data, and stores the moving image data in the storage unit 206 or the RAM 204, in accordance with an instruction from the CPU 202. The content data, which is mainly described as the moving image data in the present exemplary embodiment, may be audio data, text data, a combination of these, or another type of data. The communication unit 207 implements a protocol stack corresponding to communication specifications for communicating with the replay apparatus 102 and the relay apparatus 103, and performs the communications by using both of or either of a wired communication unit 208 and a wireless communication unit 209. In the present exemplary embodiment, the communication unit 207 implements protocols such as Hyper Text Transfer Protocol (HTTP) and Transmission Control Protocol/Internet Protocol (TCP/IP). The communication unit 207 can transmit the playlist and the content data to the replay apparatus 102 and the relay apparatus 103 in accordance with a protocol.

The communication unit 207 has a function of receiving, from the replay apparatus 102 and the relay apparatus 103, various types of information such as a request for the playlist and the content data and a response to transfer of the content, in accordance with the protocols. The communication unit 207 has a function of converting the information, received from the replay apparatus 102 and the relay apparatus 103, into a format that can be processed by the CPU 202. The replay apparatus 102 and the relay apparatus 103 according to the present exemplary embodiment have hardware configurations that are the same as that illustrated in FIG. 2.

<Configuration Diagram of Communication Apparatus Module>

Figure 3:
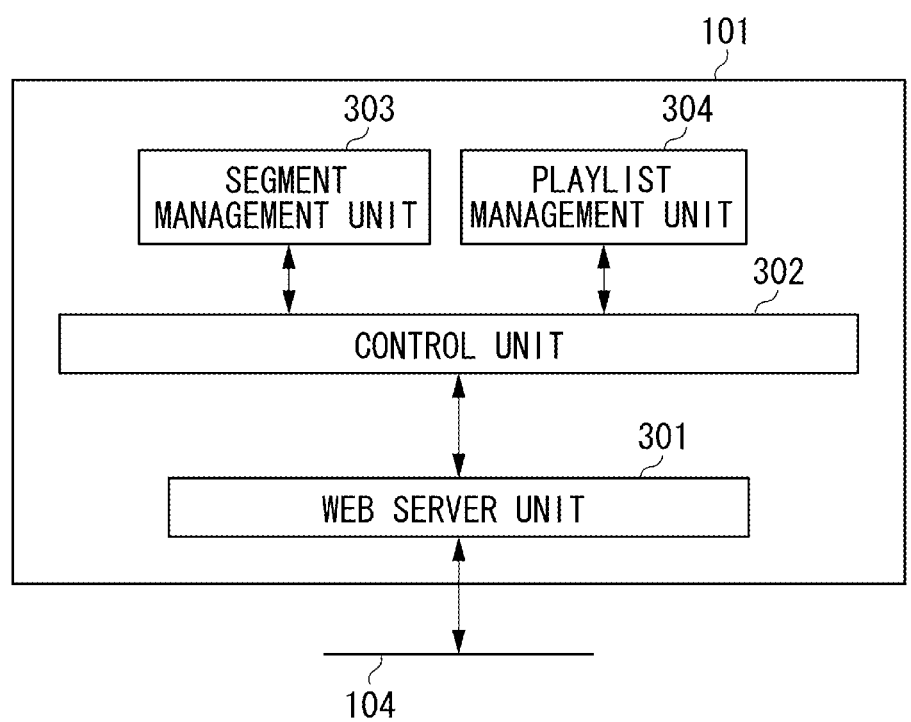
FIG. 3 is a block diagram illustrating a configuration example of functional modules of the data communication apparatus according to the exemplary embodiment.

FIG. 3 is a block diagram illustrating an example of a module configuration of the data communication apparatus 101 according to the present exemplary embodiment. As illustrated in FIG. 3, the data communication apparatus 101 according to the present exemplary embodiment includes a web server unit 301, a control unit 302, a segment management unit 303, and a playlist management unit 304.

The web server unit 301 communicates with the replay apparatus 102 and the relay apparatus 103 via the network 104. Upon receiving a request from the replay apparatus 102, the web server unit 301 acquires a requested resource from the segment management unit 303 or the playlist management unit 304 and transmits the resource. Thus, the web server unit 301 of the data communication apparatus 101 transmits the playlist to the replay apparatus 102 in response to the request for the playlist from the replay apparatus 102. The web server unit 301 transmits a segment to the replay apparatus 102 in response to the request for the segment from the replay apparatus 102 that has acquired the playlist. The playlist according to the present exemplary embodiment is list information including an acquisition source of each segment that forms the content data. In the present exemplary embodiment, an example is mainly described in which Media Presentation Description (MPD) defined in Moving Picture Experts Group-Dynamic Adaptive Streaming over HTTP (MPEG-DASH) is used as a description scheme for the playlist.

More specifically, a request issued to the data communication apparatus 101 from the replay apparatus 102 is directed to a certain uniform resource locator (URL). The web server unit 301 of the data communication apparatus 101 interprets the URL. When the resource corresponding to the URL is a playlist, the web server unit 301 acquires the playlist from the playlist management unit 304 and transmits the playlist to the replay apparatus 102. On the other hand, when the resource corresponding to the URL is a segment (content data), the web server unit 301 acquires the segment from the segment management unit 303 and transmits the segment to the replay apparatus 102.

As described below in detail, the web server unit 301 according to the present exemplary embodiment also has a function of transmitting the resource (the moving image data or the playlist) to the relay apparatus 103, and receiving a result of the transmission from the relay apparatus 103. The web server unit 301 according to the present exemplary embodiment may have an authentication function to reject (invalidate) a request from an unauthorized replay apparatus or an unauthorized request and a function to address vulnerability.

Upon receiving an acquisition request from the replay apparatus 102 for a segment that has already been transmitted from the data communication apparatus 101 to the relay apparatus 103, the web server unit 301 according to the present exemplary embodiment can redirect (transfer) the request to the relay apparatus 103. Thus, the replay apparatus 102 can receive, from the relay apparatus 103, a segment even when a request, for the segment that has been transmitted from the data communication apparatus 101 to the relay apparatus 103 and then has been deleted from the data communication apparatus 101, is transmitted from the replay apparatus 102 to the data communication apparatus 101. In this case, the segment management unit 303 described below needs to have a function of managing information indicating to which relay apparatus 103 the segment deleted from the data communication apparatus 101 has been transmitted. The web server unit 301 according to the present exemplary embodiment can redirect (transfer), to the relay apparatus 103, a request from the replay apparatus 102 for a segment that has been transmitted to the relay apparatus 103 but is not deleted from the data communication apparatus 101. Thus, a processing load can be shifted from the data communication apparatus 101 to the relay apparatus 103. The web server unit 301 may not redirect, to the relay apparatus 103, a request from the replay apparatus 102 for a segment that has been transmitted to the relay apparatus 103 and is stored in the memory of the data communication apparatus 101. In this case, the segment corresponding to the request is transmitted from the data communication apparatus 101 to the replay apparatus 102. This enables the replay apparatus 102 more likely to acquire the segment more quickly.

The web server unit 301 can determine whether to redirect the request according to a load on the data communication apparatus 101 at a timing when the request from the replay apparatus 102 is received. More specifically, the web server unit 301 redirects a request to the relay apparatus 103, when a processing load on the data communication apparatus 101, at a timing when the request is received from the replay apparatus 102, is equal to or larger than a threshold. On the other hand, the web server unit 301 does not redirect the request when the processing load on the data communication apparatus 101 is smaller than the threshold, and the segment corresponding to the request is transmitted from the data communication apparatus 101 to the replay apparatus 102. This enables the segment more likely to be provided to the replay apparatus 102 more quickly, while preventing the processing load on the data communication apparatus 101 from increasing.

The operation of the data communication apparatus 101 is not limited to the operation described above. For example, the web server unit 301 of the data communication apparatus 101 may return an error response upon receiving from the replay apparatus 102, the request for the segment that has been transmitted to the relay apparatus 103 and has been deleted from the memory of the data communication apparatus 101. The web server unit 301 may return an error response also upon receiving from the replay apparatus 102, a request for the segment that has been transmitted to the relay apparatus 103 and has not been deleted from the memory of the data communication apparatus 101.

The control unit 302 controls the entire data communication apparatus 101, and thus controls each of the web server unit 301, the segment management unit 303, and the playlist management unit 304.

The segment management unit 303 divides the content data, acquired from the image capture unit 205, into segments each corresponding to a predetermined time period, and manages the segments. More specifically, the segment management unit 303 has a function as a segment generation unit that generates the segments by dividing a moving image, acquired by the image capture unit 205, for each predetermined time period. Then, the segment management unit 303 stores the divided moving image as the segments in the RAM 204 or the storage unit 206. The segment management unit 303 has a function of managing information on the segments stored in the RAM 204 and the storage unit 206, and recognizing a segment that can be distributed. Content data segmentation processing will be described in detail below with reference to FIG. 5.

The segment management unit 303 transmits a segment, obtained by the dividing, to the replay apparatus 102 and the relay apparatus 103 via the network 104 by using the web server unit 301. The segment management unit 303 acquires and stores information indicating which segment has been transmitted to the relay apparatus 103. The segment management unit 303 can notify the playlist management unit 304 of identification information, used for identifying the segment that has been transmitted from the data communication apparatus 101 to the relay apparatus 103, and the segment that has not been transmitted from the data communication apparatus 101 to the relay apparatus 103. The segment management unit 303 can also notify the playlist management unit 304 of identification information for identifying which segment has been deleted or has not been deleted from the data communication apparatus 101, among the segments that have been transmitted from the data communication apparatus 101 to the relay apparatus 103.

The playlist management unit 304 generates the playlist, by using the identification information notified by the segment management unit 303, and manages the generated playlist. Upon acquiring the playlist request from the replay apparatus 102 via the web server unit 301, the playlist management unit 304 generates the playlist and transmits the generated playlist to the replay apparatus 102. More specifically, the playlist management unit 304 generates the playlist by using the identification information for identifying the segment that has been transmitted and the segment that has not been transmitted to the relay apparatus 103 from the data communication apparatus 101. In this case, the playlist management unit 304 generates a playlist indicating that the acquisition source of the segment that has been transmitted to the relay apparatus 103 is the relay apparatus 103, and that the acquisition source of the segment that has not been transmitted to the relay apparatus 103 is the data communication apparatus 101.

However, the playlist is not limited to the one described above. For example, the playlist management unit 304 may generate the playlist by using the identification information for identifying the segment that has been deleted from the data communication apparatus 101 and the segment that has not been deleted from the data communication apparatus 101. In this case, the playlist management unit 304 generates the playlist indicating that the acquisition source of the segment that has been deleted from the data communication apparatus 101 is the relay apparatus 103 and that the acquisition source of the segment that has not been deleted from the data communication apparatus 101 is the data communication apparatus 101.

The playlist may be generated at a timing when a new segment is generated. Thus, the playlist can be transmitted to the replay apparatus 102 at a timing earlier than that in a case where the playlist is generated after the request for the playlist is received. The playlist management unit 304 transmits the generated playlist to the replay apparatus 102 via the network 104 by using the web server unit 301. A specific method for generating the playlist will be described below with reference to FIG. 4 and FIG. 6 to FIG. 10.

<Acquisition Source Determination Processing>

Figure 4:
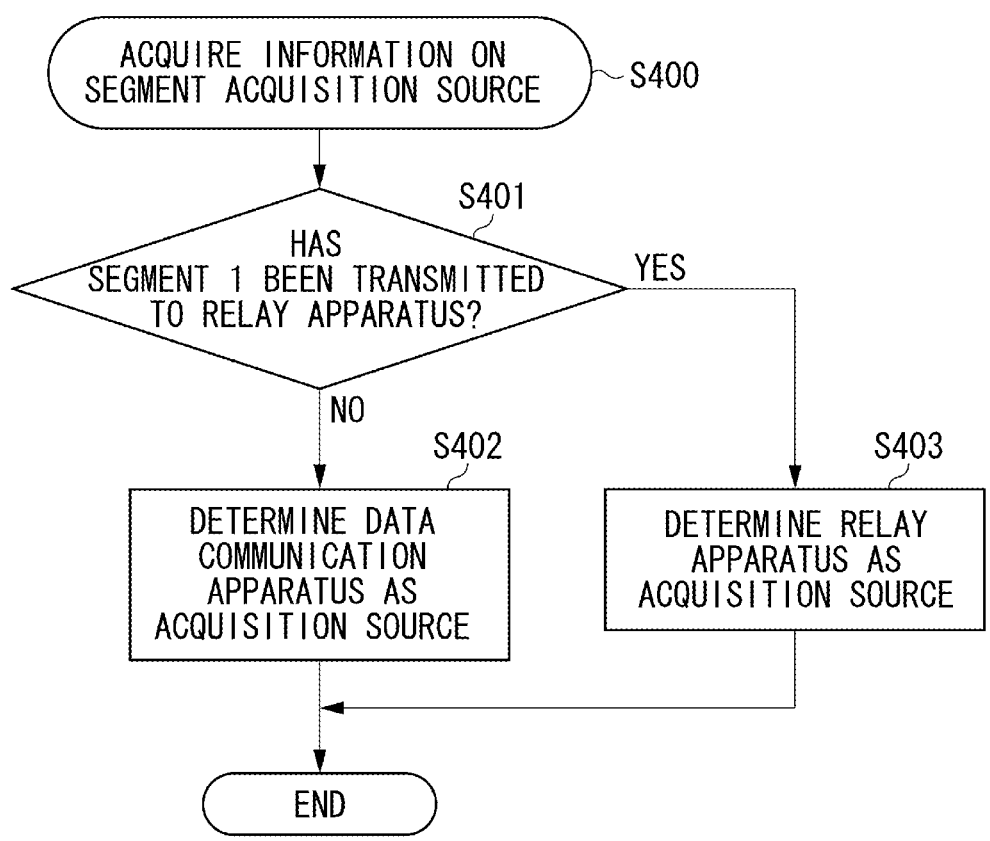
FIG. 4 is a flowchart illustrating acquisition source determination processing according to the exemplary embodiment.

FIG. 4 is a flowchart illustrating processing executed by the playlist management unit 304 for generating the playlist according to the present exemplary embodiment. The processing in FIG. 4 is implemented by the CPU 202 of the data communication apparatus 101, illustrated in FIG. 2, executing a predetermined program. Alternatively, the processing in FIG. 4 may be executed by dedicated hardware.

In the present exemplary embodiment, a configuration is mainly described in which the processing in FIG. 4 starts at a timing when the data communication apparatus 101 receives the playlist request from the replay apparatus 102. However, the configuration is not limited thereto. For example, the playlist management unit 304 may execute the processing in FIG. 4 every time a new segment is generated or every time a predetermined time period elapses.

When the data communication apparatus 101 receives the playlist request from the replay apparatus 102, in step S400, the playlist management unit 304 acquires information related to the acquisition source of a segment from the segment management unit 303. For example, the playlist management unit 304 acquires information for identifying, among a plurality of segments forming a moving image, a segment that has been transmitted from the data communication apparatus 101 to the relay apparatus 103 and a segment that has not been transmitted. Alternatively, for example, the playlist management unit 304 may acquire information for identifying, among the plurality of segments forming the moving image, a segment that has been deleted from the data communication apparatus 101 and a segment which has not been deleted. The processing proceeds to step S401 when the playlist management unit 304 acquires the information (identification information) related to the acquisition source of the segment from the segment management unit 303.

An example where the playlist management unit 304 acquires the information for identifying the segment that has been transmitted to the relay apparatus 103 and the segment that has not been transmitted is mainly described with reference to FIG. 4. In the present exemplary embodiment, a case is mainly described where the content data, processed by the data communication apparatus 101, is moving image data. However, the content data is not limited to the moving image, and may be audio data or text data.

In step S401, the playlist management unit 304 determines whether a segment 1, among the plurality of segments forming the moving image that has been requested by the replay apparatus 102, is a segment that has been transmitted from the data communication apparatus 101 to the relay apparatus 103. When the segment 1 has been transmitted to the relay apparatus 103 (YES in step S401), the processing proceeds to step S403. In step S403, the playlist management unit 304 determines that the acquisition source of the segment 1 is the relay apparatus 103, which is the transmission destination. When the segment 1 has been transmitted but is still stored in the memory of the data communication apparatus 101, the playlist management unit 304 may generate a playlist indicating that the acquisition source of the segment 1 is the data communication apparatus 101.

Alternatively, when the segment 1 has been transmitted to the relay apparatus 103 but is still stored in the memory of the data communication apparatus 101, the playlist management unit 304 may determine the content of the playlist as follows in accordance with a current load condition of the data communication apparatus 101. More specifically, when the load on the data communication apparatus 101 is smaller than a threshold, the playlist management unit 304 may generate a playlist indicating that the acquisition source of the segment 1 is the data communication apparatus 101. On the other hand, when the load is equal to or larger than the threshold, the playlist management unit 304 may generate a playlist indicating that the acquisition source of the segment 1 is the relay apparatus 103.

The playlist management unit 304 according to the present exemplary embodiment acquires identification information on the relay apparatus 103 serving as the transmission destination of the segment, from the segment management unit 303. Such a configuration enables a system including a plurality of the relay apparatuses 103 to manage to which relay apparatus 103 each segment has been transmitted.

When the playlist management unit 304 determines that the segment 1 has not been transmitted to the relay apparatus 103 in step S401 (NO in step S401), the processing proceeds to step S402. In step S402, the playlist management unit 304 determines that the acquisition source of the segment 1 is the data communication apparatus 101. When the processing on the segment 1 (processing in step S402 or 403) is completed, the processing returns to step S401 where the playlist management unit 304 performs processing on a segment 2. When the processing from steps S401 to S403 is completed on all the segments forming the moving image corresponding to the request from the replay apparatus 102, the playlist management unit 304 generates a playlist based on information indicating an acquisition source of each segment.

<Content Data Segmentation Processing>

FIG. 5 is a flowchart illustrating processing executed by the segment management unit 303 upon acquiring the content data according to the present exemplary embodiment. The processing in FIG. 5 is implemented by the CPU 202 of the data communication apparatus 101 illustrated in FIG. 2 executing a predetermined program. Alternatively, the processing in FIG. 5 may be executed by dedicated hardware.

In the present exemplary embodiment, the processing in FIG. 5 starts at a timing when the image capture unit 205 of the data communication apparatus 101 starts capturing a moving image. However, the configuration is not limited to this example, and the processing in FIG. 5 may start at a timing when the data communication apparatus 101 acquires a moving image file, for example, from an external apparatus. In step S500, the segment management unit 303 acquires the content data (moving image data) from the image capture unit 205. Then, in step S501, the segment management unit 303 divides the content data, acquired from the image capture unit 205, into segments. The segment manage segment management unit 303 according to the present exemplary embodiment divides the moving image data for each predetermined time period (for example, two seconds) to generate the segments. However, a method of dividing the segments is not limited to the above-described method, and the processing in step S501 may be omitted when the content data that has already been divided into segments is received.

In step S502, the segment management unit 303 converts the format of each of the divided segments into a content data storage format such as MP4 or M2TS. The content data storage format is not limited to these, and the processing in step S502 may be omitted when the content data that already has the corresponding format is input.

The segment management unit 303 continuously performs the processing in step S500 to step S502, from the start to the end of the moving image capturing. For example, when a time period from the start to the end of the moving image capturing is 100 seconds, the segment management unit 303 divides the moving image data corresponding to 100 seconds into 50 segments, and converts the format of each segment into the content storage format. The segment management unit 303 can simultaneously execute the processing in steps S500 to S502 and processing in step S503 and the subsequent steps.

In step S503, the segment management unit 303 determines whether there is an unprocessed segment. When the segment management unit 303 determines that there is no unprocessed segment (NO in step S503), the processing in FIG. 5 is terminated. On the other hand, when the segment management unit 303 determines that there is an unprocessed segment (YES in step S503), the processing proceeds to step S504.

In step S504, the segment management unit 303 determines whether a segment buffer in the RAM 204 is in a predetermined state. More specifically, the segment management unit 303 determines whether the memory of the data communication apparatus 101 for storing a segment is in a predetermined state. The segment management unit 303 according to the present exemplary embodiment determines whether the segment buffer is in the predetermined state (a state where a predetermined amount of data has been stored), based on a memory size of the segment buffer, an average size of the segments, and the number of segments stored in the segment buffer. The predetermined state, which is determined by the segment management unit 303, is not limited to the above-described state, and the segment management unit 303 may determine whether the predetermined number of segments has been stored, for example.

The segment management unit 303 may determine whether the segment buffer is in the predetermined state, based on a time period during which the data communication apparatus 101 guarantees a low delay. This low delay guaranteed time period is between a point at which a segment is stored in the data communication apparatus 101 and a point when the segment becomes unable to be transmitted with a low delay. For example, when a single segment corresponds to a moving image corresponding to two seconds and the guaranteed time period is 10 seconds, five newest segments have to be transmitted with a low delay in response to a request from the replay apparatus 102. Therefore, the data communication apparatus 101 may perform the determination in step S504 in such a manner that the five newest segments are constantly stored in the segment buffer in the RAM 204, and the other segments are stored in an area other than the RAM 204. It is to be noted that the segments stored in the RAM 204 can be accessed faster than those stored in the storage unit 206, and thus can be transmitted with a low delay.

When the segment management unit 303 determines that the segment buffer in the RAM 204 is not in the predetermined state in step S504 (NO in step S504), the segment management unit 303 stores the segment being processed in the segment buffer in the RAM 204 in step S509, and the processing returns to step S503. For example, when it is determined that the predetermined amount of data or the predetermined number of segments has not been stored in the segment buffer, the segment management unit 303 stores a new segment in the segment buffer.

On the other hand, when the segment management unit 303 determines that the segment buffer in the RAM 204 is in the predetermined state (YES in step S504), the management unit 303 moves a predetermined segment in the RAM 204 to the storage unit 206 in step S505. The storage unit 206 has a data reading speed lower than the RAM 204, but has a larger storage capacity than the RAM 204.

The segment, which is moved to the storage unit 206 when the segment buffer in the RAM 204 is in the predetermined state, is, for example, the oldest segment stored in the segment buffer. More specifically, one of a plurality of segments stored in the RAM 204 that has been acquired by the data communication apparatus 101 at an early timing can be moved to the storage unit 206. However, the moved segment is not limited to the oldest one, and, for example, segments that have been stored in the segment buffer for a time period exceeding a threshold may be collectively moved to the storage unit 206.

In step S506, the segment management unit 303 determines whether the segment storage area in the buffer is in a predetermined state. This determination may be made using the same method as that for determining whether the segment buffer in the RAM 204 is in the predetermined state.

It is to be noted that transmitting the segment stored in the storage unit 206 involves a longer access time compared with the segment stored in the RAM 204, resulting in a lager delay. Still, the storage unit 206 is effectively used when the RAM 204 has a small capacity and thus cannot store a large number of segments.

The low delay distribution can be prioritized as follows. When the segment buffer in the RAM 204 is determined to be in the predetermined state, the predetermined segment (e.g., the oldest segment) stored in the segment buffer in the RAM 204 may be overwritten with a new segment. The segment management unit 303 transmits the segment to be overwritten to the relay apparatus 103 before the overwriting is executed. More specifically, upon determining that the segment buffer is in the predetermined state, the segment management unit 303 sets a storage area storing the oldest segment so that it can be overwritten. As a result, the new segment can be stored in the storage area.

When the segment management unit 303 determines that the segment storage area in the buffer is in the predetermined state (YES in step S506), the processing proceeds to step S508. In step S508, the segment management unit 303 overwrites the predetermined segment (e.g., the oldest segment), among the plurality of segments stored in the segment storage area, with a new segment. The segment management unit 303 transmits the segment to be overwritten, among the plurality of segments stored in the storage unit 206, to the relay apparatus 103, before the overwriting is executed.

On the other hand, when the segment management unit 303 determines that the segment storage area in the buffer is not in the predetermined state in step S506 (NO in step S506), the processing proceeds to step S507. In step S507, the segment management unit 303 stores the predetermined segment (e.g., the oldest segment), among the plurality of segments in the RAM 204, in the segment storage area in the buffer. When the processing in step S507 or S508 is completed, in step S509, the segment management unit 303 stores the new segment in an empty area in the segment buffer in the RAM 204, obtained through the processing in steps S505 to S508. Then, the processing returns to step S503 to be executed on the next segment.

<Description Content of Generated Playlist>

Three specific examples of the playlist generated by the playlist management unit 304 are described with reference to FIG. 6 to FIG. 10. In the present exemplary embodiment, a scheme corresponding to MPD defined in MPEG-DASH is described as a description format of the playlist. However, the description format of the playlist is not limited to MPD defined in MPEG-DASH. It is to be noted that information required for the playlist is partially omitted in FIG. 6 to FIG. 10 to simplify the description.

A first description example is described with reference to FIG. 6 and FIG. 7. The playlist illustrated in FIG. 6 represents a description example based on a SegmentList scheme, in which a list of segments that can be distributed is described in the playlist. A playlist 601 is generated in M1102 illustrated in FIG. 11. A portion 602 indicating an URL for acquiring the segment 1 includes a host name, described as ExampleSource, indicating the data communication apparatus 101. The host name is not limited to this, and any value, such as an Internet protocol (IP) address, may be employed as long as the data communication apparatus 101 can be identified. The replay apparatus 102 that has acquired the playlist 601 accesses the URL indicated by the portion 602, and acquires the segment 1 stored in the data communication apparatus 101.

A portion 603 indicating minimumUpdatePeriod represents a value for notifying an update timing of the playlist, and indicates an interval at which the replay apparatus 102 is expected to request the playlist. A portion 604 indicating availabilityStartTime represents a time point when the playlist becomes available. The replay apparatus 102 can recognize the segment that can be currently distributed through comparison between this time point and the current time point. A portion 605 indicating timeShiftBufferDepth represents information on a time period during which segment distribution is guaranteed on the server side (the data communication apparatus 101 side). This information can be defined based on the number of buffers in which segments are stored, as described with reference to FIG. 5.

For example, the portion 605 illustrated in FIG. 6 indicates that a moving image corresponding to four seconds can be stored in the buffer in the data communication apparatus 101. A playlist 701 illustrated in FIG. 7 is updated in M1109 illustrated in FIG. 11. A URL 702 for acquiring the segment 2 stored in the data communication apparatus 101 includes a host name, described as ExampleProxy, indicating the relay apparatus 103. The host name is not limited to this, and any value, such as an IP address, may be employed as long as the relay apparatus 103 can be identified. It can be seen here that the acquisition source of the segment 1, which is the data communication apparatus 101 in the playlist 601 illustrated in FIG. 6, is changed to the relay apparatus 103 in the playlist 701 illustrated in FIG. 7.

As described above with reference to FIG. 6 and FIG. 7, when the segment 1 has been transmitted to and the segment 2 has not been transmitted to the relay apparatus 103, among the plurality of segments forming the moving image, the playlist management unit 304 according to the present exemplary embodiment generates the following playlist. The playlist management unit 304 generates list information (playlist) indicating that the acquisition sources of the segments 1 and 2 are respectively the relay apparatus 103 and the data communication apparatus 101. In other words, when the relay apparatus 103 includes the segment 1 but does not include the segment 2, the playlist management unit 304 generates the following playlist. The playlist management unit 304 generates list information (playlist) indicating that the acquisition sources of the segments 1 and 2 are respectively the relay apparatus (information processing apparatus) 103 and the data communication apparatus 101. The relay apparatus 103 according to the present exemplary embodiment is an information processing apparatus that can transmit and receive content data.

The segment 2 that has not been transmitted is not necessarily transmitted to the relay apparatus 103. The list information (playlist) is provided to a reception apparatus that receives contents. The list information may be provided from the data communication apparatus 101 or the relay apparatus 103, to the reception apparatus (replay apparatus 102).

Thus, contents, such as a live performance that should be provided in real time, can be acquired from the data communication apparatus 101, and past contents can be acquired from the relay apparatus 103. In this configuration, no special processing is required on the replay apparatus 102 side, and thus the control described above can be implemented with a general replay apparatus supporting MPEG-DASH.

A second description example of a playlist based on a SegmentTemplate scheme is described with reference to FIG. 8.

With the SegmentTemplate scheme, a smaller MPD, defined in MPEG-DASH, can be achieved. For example, in the playlist 701 based on the SegmentList scheme illustrated in FIG. 7, an increase in the number of segments can only be represented by an increase in the lines, and thus leads to a larger MPD. On the other hand, the SegmentTemplate uses a template of a URL, whereby the MPD can be prevented from becoming larger due to the increase in the number of segments.

In a playlist 801 illustrated in FIG. 8 as a specific example, template URLs are described in portions 802 and 803. The replay apparatus 102 that has received the playlist 801 illustrated in FIG. 8 can generate a URL for requesting a desired segment by replacing a portion "$Number$" with the number allocated to the segment.

The replay apparatus 102 side can determine the number allocated to the segment that can be distributed based on information corresponding to the portions 604 and 605 illustrated in FIG. 6, information on the current time point, a time period corresponding to each segment indicated by portions 804 and 806, and a starting number indicated by portions 805 and 807.

When requesting the segment 1, the replay apparatus 102 that has acquired the playlist 801 illustrated in FIG. 8 can acquire the URL for acquiring the segment 1 by referring to a startNumber. More specifically, even when the playlist 801 is generated based on the SegmentTemplate scheme as illustrated in FIG. 8, the list information indicating that the acquisition sources of the segments 1 and 2 are respectively the relay apparatus 103 and the data communication apparatus 101 is generated.

A third description example is described with reference to FIG. 9 and FIG. 10. Here, a method of distinguishing between a playlist for acquiring live contents and a playlist for acquiring recorded contents is described.

The data communication apparatus 101 can generate a playlist 901, illustrated in FIG. 9, for the recorded contents, and can generate a playlist 1001, illustrated in FIG. 10, for the live contents. When requesting the data communication apparatus 101 to transmit a playlist, the replay apparatus 102 can designate either of the playlists for the live contents or the recorded contents. The data communication apparatus 101 transmits the playlist designated by the replay apparatus 102. How to designate a playlist type includes a method of using a URL path or a method of adding different queries to the same path, but is not limited these methods.

The playlist 901 for the recorded contents illustrated in FIG. 9 is list information indicating that the acquisition source of the segment 1 is the relay apparatus 103. The playlist 1001 for the live contents illustrated in FIG. 10 is list information indicating that the acquisition source of the segment 2 is the data communication apparatus 101. Thus, the data communication apparatus 101 generates first list information with which the replay apparatus 102 acquires the segment 2, among the plurality of segments, not transmitted from the data communication apparatus 101 to the relay apparatus 103. The data communication apparatus 101 generates second list information with which the replay apparatus 102 acquires the segment 2, among the plurality of segments, transmitted from the data communication apparatus 101 to the relay apparatus 103.

<Content Distribution Sequence>

Figure 11:
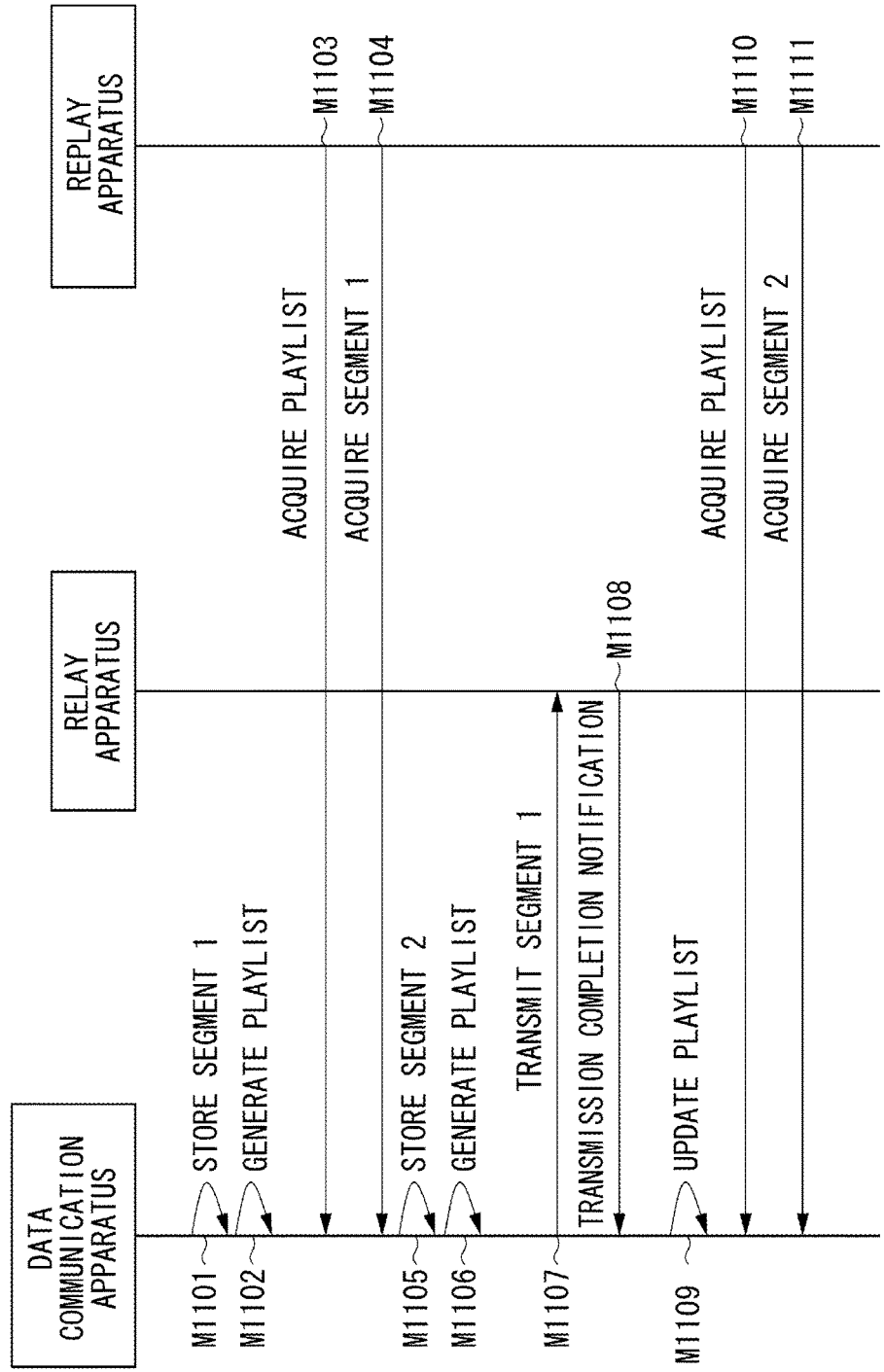
FIG. 11 illustrates an example of a sequence among the data communication apparatus, a replay apparatus, and a relay apparatus, according to the exemplary embodiment.
Figure 12:
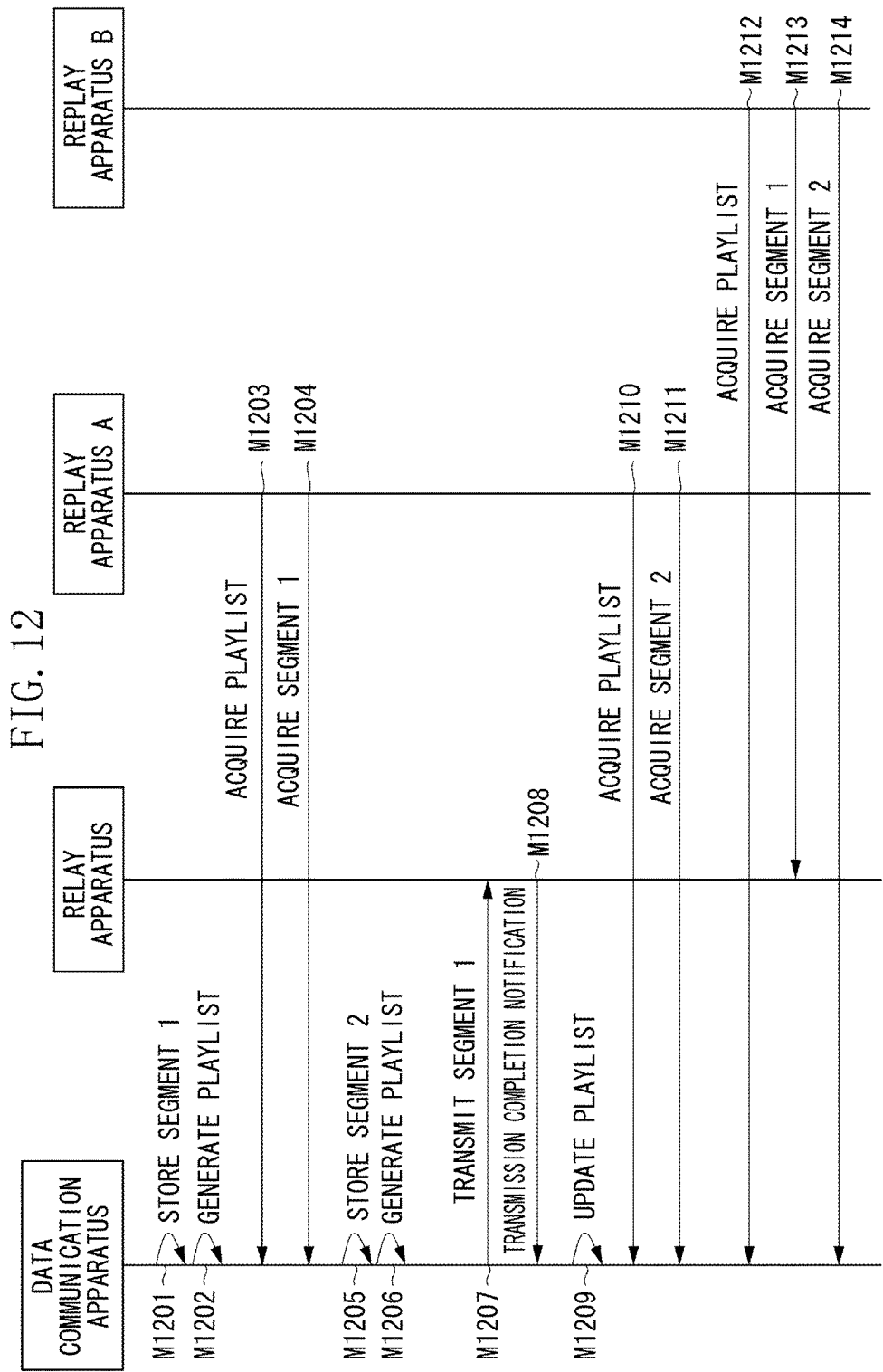
FIG. 12 illustrates an example of a sequence among the data communication apparatus, a plurality of the replay apparatuses, and the relay apparatus, according to the exemplary embodiment.

Three examples of content distribution sequences, among the data communication apparatus 101, the replay apparatus 102, and the relay apparatus 103, are described with reference to FIG. 11 to FIG. 13. FIG. 11 illustrates a sequence in a system configuration in which the number of each of the data communication apparatus 101, the replay apparatus 102, and the relay apparatus 103 is one, and the SegmentList scheme described above is used for describing the playlist.

The data communication apparatus 101 stores the segment 1 in the segment buffer of the RAM 204 in M1101. When the processing in M1101 is completed, the data communication apparatus 101 generates a playlist, similar to the playlist 601 illustrated in FIG. 6 for example, in M1102. The playlist may be generated in response to the reception of the playlist acquisition request from the replay apparatus 102.

After generating the playlist in M1102, upon receiving the playlist acquisition request from the replay apparatus 102 in M1103, the data communication apparatus 101 transmits the generated playlist. The replay apparatus 102 extracts the URL indicated by the portion 602 corresponding to the segment 1 from the acquired playlist. Then, in M1104, the replay apparatus 102 accesses the extracted URL to issue an acquisition request for the segment 1 to the data communication apparatus 101. The data communication apparatus 101 that has received the acquisition request for the segment 1 transmits the segment 1 to the replay apparatus 102.

The playlist management unit 304 stores the segment 2 in M1105 in a similar manner to the processing in M1101, and updates the playlist in M1106. After completing the transmission of the segment 1 to the replay apparatus 102, the data communication apparatus 101 transmits the segment 1 to the relay apparatus 103 in M1107.

Upon receiving notification indicating that the transmission of the segment 1 has been completed in M1108, the data communication apparatus 101 updates the playlist in M1109 so that a playlist similar to the playlist 701 in FIG. 7 is obtained. In M1110, the replay apparatus 102 acquires the playlist in a similar manner to the processing in M1103, and acquires the segment 2 in M1111 in a similar manner to the processing in M1104. The playlist is not necessarily generated in M1105 or updated in M1109, and a new playlist may be generated in response to the acquisition request for the playlist from the replay apparatus 102.

An example has been described above with reference to FIG. 11, in which the data communication apparatus 101 can store the maximum of two segments in the segment buffer in the RAM 204, and does not use the storage unit 206 for storing a segment. Thus, in the example described with reference to FIG. 11, when acquiring the segment 2, the data communication apparatus 101 transmits the segment 1, acquired before the segment 2, to the relay apparatus 103. Then, upon receiving the segment 3, the data communication apparatus 101 overwrites a storage area in the RAM 204, where the segment 1 has been stored, with the segment 3, and transmits the segment 2 to the relay apparatus 103. Alternatively, the RAM 204 may have a segment buffer of a larger capacity, or the storage unit 206 may be used to store the segment as described above with reference to FIG. 5.

Next, a configuration involving a plurality of the replay apparatuses 102 is described with reference to FIG. 12. Processing in M1201 to M1211 is the same as the processing in M1101 to M1111 illustrated in FIG. 11. It is assumed in this configuration that a second replay apparatus B joins the system in M1212.

Thus, processing in M1212 is assumed to be executed when the data communication apparatus 101 receives a request for the playlist from the replay apparatus B, in a state where the segment 1 has been transmitted to the relay apparatus 103, and the segment 2 has not been transmitted to the relay apparatus 103. In this case, the data communication apparatus 101 transmits the playlist (corresponding to the playlist 701 in FIG. 7) that has been updated in M1209 to the replay apparatus B. The replay apparatus B that has acquired the playlist in M1212 can acquire the segment 1 from the relay apparatus 103 and can acquire the segment 2 from the data communication apparatus 101, in accordance with the URLs described in the playlist. Upon receiving the acquisition request for the playlist from the replay apparatus B during a time period after the processing in M1206 is completed and before the processing in M1209 is completed, the data communication apparatus 101 transmits the playlist updated in M1206 to the replay apparatus B.

The playlist updated in M1206 indicates that the acquisition source of each of the segment 1 and segment 2 is the data communication apparatus 101. When the replay apparatus B that has acquired the playlist updated in M1206 transmits the request for the segment 1 to the data communication apparatus 101 after the processing in M1209 is completed, the data communication apparatus 101 according to the present exemplary embodiment operates as follows. The data communication apparatus 101 determines whether the segment 1 can be provided by the data communication apparatus 101 (whether the segment 1 is stored in the memory of the data communication apparatus 101). When determining that the segment 1 can be provided, the data communication apparatus 101 transmits the segment 1 to the replay apparatus B. On the other hand, when determining that the segment 1 cannot be provided to the replay apparatus B, the communication apparatus 101 redirects (transfers) the request from replay apparatus B to the replay apparatus 103. As described above, the configuration involving a plurality of the replay apparatuses 102 has a feature that the acquisition source of each segment changes in accordance with a timing when each replay apparatus 102 acquires the playlist.

As the final example, a case where the relay apparatus 103 distributes the playlist is described with reference to FIG. 13. The playlist may be generated and distributed to the replay apparatus 102 by the data communication apparatus 101 or by the relay apparatus 103. The playlist generated by the data communication apparatus 101 may be transmitted to the relay apparatus 103, and then distributed to the replay apparatus 102 from the relay apparatus 103. When the playlist is generated and distributed by the relay apparatus 103, the data communication apparatus 101 needs to notify the relay apparatus 103 of information related to a stored state of a segment. When the relay apparatus 103 does not generate but only distributes the playlist, the playlist generated by the data communication apparatus 101 needs to be transmitted to the relay apparatus 103. FIG. 13 illustrates a sequence in this case (a case where the relay apparatus 103 does not generate the playlist but transmits the playlist, received from the data communication apparatus 101, to the replay apparatus 102).

The example in FIG. 13 is different from the example illustrated in FIG. 11 in M1303, M1308, and M1312 where the data communication apparatus 101 transmits the generated or updated playlist to the relay apparatus 103. Thus, in the operation sequence, the replay apparatus 102 receives the playlist from the relay apparatus 103 in M1304 and M1313. When the playlist is not distributed by the data communication apparatus 101 but is distributed by the relay apparatus 103, a processing load, applied to the data communication apparatus 101 due to the processing executed in response to the request for the playlist, can be reduced. This is particularly effective when a large number of the replay apparatuses 102 frequently request the playlist. The relay apparatus 103 may collect information on a plurality of contents (e.g., a moving image) stored in a plurality of data communication apparatuses 101, and generate a single playlist therewith.

As described above, the communication apparatus 101 according to the present exemplary embodiment can transmit to the relay apparatus 103, a predetermined segment (e.g., an old segment) among a plurality of segments forming a moving image. When the segment 1 has been transmitted and the segment 2 has not been transmitted to the relay apparatus 103, among the plurality of segments, the data communication apparatus 101 generates the playlist (list information) related to the acquisition sources of the plurality of segments as follows. More specifically, the data communication apparatus 101 generates a playlist indicating that the acquisition source of the segment 1 is the relay apparatus 103 and the acquisition source of the segment 2 is the data communication apparatus 101, and transmits the playlist to the replay apparatus 102. The data communication apparatus 101 provides a segment in response to a request for the segment from the replay apparatus 102 that has received the playlist. In such a configuration, the replay apparatus 102 (reception apparatus) can easily acquire a moving image (content data) even in a use case where the data communication apparatus 101 transmits some of the segments forming the moving image to another communication apparatus (relay apparatus 103). As described above in the exemplary embodiment, various types of operations performed by the data communication apparatus 101 and the relay apparatus 103 may be employed. For example, a configuration in which the relay apparatus 103 transmits the playlist to the replay apparatus 102 can be employed. Furthermore, a plurality of the data communication apparatuses 101 (content providing apparatus), the replay apparatus 102 (reception apparatus), and a plurality of the relay apparatuses 103 may exist on the network 104.

With the configuration according to the present exemplary embodiment, the reception apparatus can easily acquire desired content data (media content).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167827, filed Aug. 20, 2014, which is hereby incorporated by reference herein in its entirety.

What is claimed is:

1. A communication apparatus comprising:
a hardware processor; and
a memory storing one or more programs configured to be executed by the hardware processor, the one or more programs including instructions for:
acquiring a media content;
transmitting the media content acquired by the acquiring to another communication apparatus;
determining whether to describe, as an acquisition source URL of the media content acquired by the acquiring, a URL of the communication apparatus or a URL of the another communication apparatus, in accordance with a state of transmission of the media content;
generating, based on the determination made by the determining, a description file in which the acquisition source URL of each predetermined unit of the media content is described; and
providing the description file generated by the generating.

2. The communication apparatus according to claim 1, wherein the determining is configured to determine to describe the URL of the another communication apparatus as an acquisition source URL of a media content that has been acquired by the acquiring and has been transmitted to the another communication apparatus, and to describe the URL of the communication apparatus as an acquisition source URL of a media content that has been acquired by the acquiring and has not been transmitted to the another communication apparatus.

3. The communication apparatus according to claim 1, wherein the providing is configured to provide the description file generated by the generating to a reception apparatus, and provide, in response to an acquisition request for the acquisition source URL corresponding to the communication apparatus from the reception apparatus, a media content corresponding to the acquisition source URL to the reception apparatus.

4. The communication apparatus according to claim 1, the one or more programs further including instructions for transferring, in a case where a media content corresponding to a URL corresponding to an acquisition request from a reception apparatus has been transmitted to the another communication apparatus by the transmitting, the acquisition request to the another communication apparatus.

5. The communication apparatus according to claim 1, wherein the transmitting is configured to transmit the media content, for which a predetermined time has elapsed from the acquisition by the acquiring, to the another communication apparatus.

6. The communication apparatus according to claim 1, wherein the memory is configured to store the media content acquired by the acquiring, and
wherein the transmitting is configured to transmit a part of the media content in the memory, in accordance with a data amount of the media content stored in the memory, to the another communication apparatus.

7. The communication apparatus according to claim 1, the one or more programs further including instructions for generating segments by dividing the media content, acquired by the acquiring, into the segments each corresponding to a respective predetermined time period,
wherein the transmitting is configured to control transmission of the media content to the another communication apparatus based on each of the segments, and
wherein the determining is configured to determine to describe the URL of the communication apparatus or to describe the URL of the another communication apparatus as the acquisition source URL for each of the segments.

8. The communication apparatus according to claim 1, the one or more programs further including instructions for receiving a request for the description file,
wherein the generating is configured to generate the description file based on the determination made by the determining, in response to reception of the request for the description file by the receiving, and
wherein the providing is configured to provide the description file generated by the generating to a communication apparatus that has transmitted the request for the description file.

9. A communication method for a communication apparatus comprising:
acquiring a media content;
transmitting the acquired media content to another communication apparatus;
determining whether to describe, as an acquisition source URL of the acquired media content, a URL of the communication apparatus or a URL of the another communication apparatus, in accordance with a state of transmission of the media content to the another communication apparatus;
generating, based on the determination, a description file in which an acquisition source URL of each predetermined unit of the media content is described; and
providing the generated description file.

10. The communication method according to claim 9, wherein, in the determining, it is determined to describe the URL of the another communication apparatus as an acquisition source URL of a media content that has been acquired and has been transmitted to the another communication apparatus, and to describe the URL of the communication apparatus as an acquisition source URL of a media content that has been acquired and has not been transmitted to the another communication apparatus.

11. The communication method according to claim 9, wherein, in the providing, the generated description file is provided to a reception apparatus, and, in response to an acquisition request for the acquisition source URL corresponding to the communication apparatus from the reception apparatus, a media content corresponding to the acquisition source URL is provided to the reception apparatus.

12. A non-transitory computer-readable storage medium storing a program for causing a computer to execute a method for a communication apparatus, the method comprising:
acquiring a media content;
transmitting the acquired media content to another communication apparatus;
determining whether to describe, as an acquisition source URL of the acquired media content, a URL of a communication apparatus or a URL of the another communication apparatus, in accordance with a state of transmission of the media content to the another communication apparatus;

generating, based on the determination, a description file in which the acquisition source URL of each predetermined unit of the media content is described; and providing the generated description file.

13. The non-transitory computer-readable storage medium according to claim 12, wherein, in the determining, it is determined to describe the URL of the another communication apparatus as an acquisition source URL of a media content that has been acquired and has been transmitted to the another communication apparatus, and to describe the URL of the communication apparatus as an acquisition source URL of a media content that has been acquired and has not been transmitted to the another communication apparatus.

14. The non-transitory computer-readable storage medium according to claim 12, wherein, in the providing, the generated description file is provided to a reception apparatus, and, in response to an acquisition request for the acquisition source URL corresponding to the communication apparatus from the reception apparatus, a media content corresponding to the acquisition source URL is provided to the reception apparatus.

* * * * *